INVENTORS
JOHN HUGH RUTLAND MANNERS
ROYSTON ARTHUR GEORGE

BY *Larson and Taylor*

ATTORNEYS

United States Patent Office 3,222,538
Patented Dec. 7, 1965

3,222,538
SURGE PREVENTING CIRCUITS
John H. R. Manners and Royston A. George, London, England, assignors to Westinghouse Brake and Signal Company Limited, London, England
Filed Dec. 8, 1961, Ser. No. 158,092
Claims priority, application Great Britain, Jan. 2, 1961, 22/61
8 Claims. (Cl. 307—88.5)

This invention relates to the prevention or reduction of surges in circuit arrangements for controlling the supply of electric current to a load.

In means for varying the mean value of current supplied to a load from an A.C. supply it is known to provide electronic switching devices inserted between the supply and the load and to control the relative duration of the "on" and "off" periods of the electronic switch or switches. The circuit arrangement may be such that the power supplied to the load is A.C. or D.C. by rectification.

Following the closing of such an electronic switch or switches the instantaneous value of the current flowing is dependent upon the instantaneous value of the supply voltage and upon the impedance of the load. With certain types of load the initial impedance is much lower than under steady operation conditions. Therefore it is possible for an initial surge current to flow which may be large enough to cause damage to circuit components, including the electronic switch or switches.

According to the present arrangement there is provided a circuit to which are applied a control signal and an information signal, the information signal being derived from the current supplied to the load. The circuit provides, through a time delay, for the modification of the control signal so as to cause the control signal to cause a control circuit for the load current to restrict the magnitude of the current in the load immediately following switching on; the level of the restricted load current being substantially less than the unrestricted or unmodified load current.

A preferred form of the invention will now be described, by way of example only, with reference to the accompanying drawings.

Figure 1:
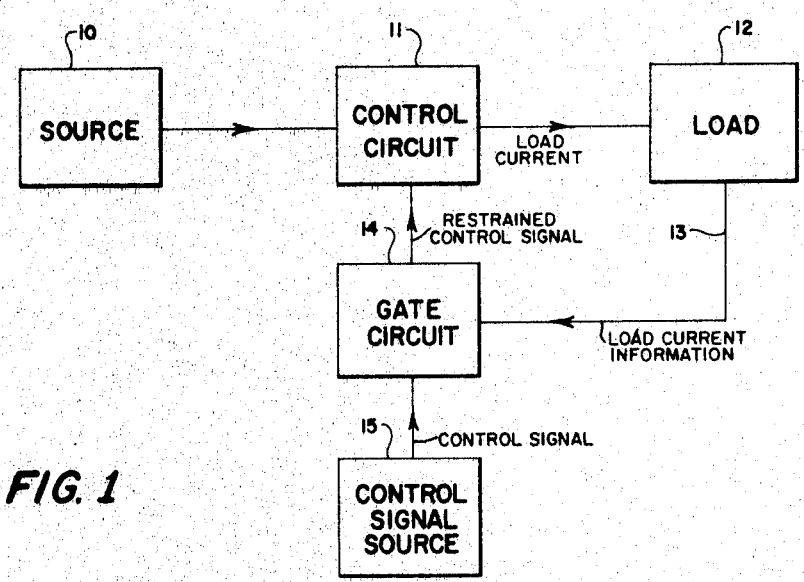
Figure 2:
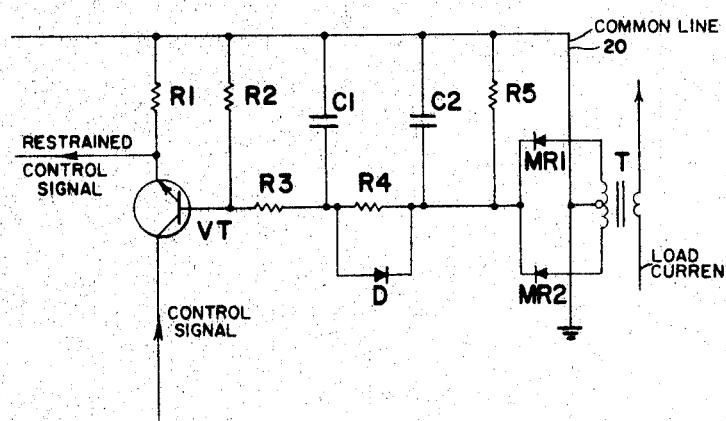

FIG. 1, illustrates a block diagram of a circuit arrangement embodying a gate circuit adapted to restrain the magnitude of the control signal in accordance with the invention; and FIG. 2, illustrates a simplified form of a specific gate circuit.

Referring now to FIG. 1, a source of electrical energy 10 is connected in series through a control circuit 11 to a load 12, a path 13 carrying an information signal dependent upon the value of load current being connected from the load 12 to a gate circuit 14.

A control signal source 15 is arranged to feed a control signal to the gate circuit 14, this signal being modified in dependence upon the signal in path 13 by the gate circuit 14 and applied to the control circuit 11.

Referring now to FIG. 2, this illustrates one form of gate circuit and load current sensing means in which the load current is arranged to flow in the primary winding of a transformer T and a voltage, which is proportional to the load current, is induced in the secondary winding of the transformer.

Rectifiers MR1 and MR2 are connected to each end of the secondary winding in such a manner as to form a full-wave rectifying circuit, a centre tapping of the secondary winding being connected to a line 20 which is common to both the gate circuit and the control circuit.

The junction of the two rectifiers MR1 and MR2 is connected, through resistors R4 and R3 in series, to the base of a transistor VT, a control signal supplied from an independent source, being impressed on the collector thereof. The control signal to be fed to the control circuit is taken from the junction of the emitter of the transistor VT and a resistor R1. The resistor R1 is connected between the emitter of the transistor VT and the line 20, a further resistor R2 being connected between the common line 20 and the junction of the base electrode of the transistor VT and resistor R3.

One terminal of a capacitor C1 is connected to the junction of resistors R3 and R4 and the other terminal of C1 is connected to the common line 20. The resistor R4 is shunted by an appropriately poled diode D.

A further capacitor C2 and a resistor R5 are connected in parallel between the common line 20 and the junction of the resistor R4 with the junction of the rectifier MR1 and MR2.

In the operation of the circuit arrangement of FIGURE 1, when a current is established in the load, the control signal from 15 is operative to control the operation of 11 such that the supply is switched to the load at instants in each half cycle thereof which will produce a desired mean load current. If the mean load current is required to be increased, the value of the signal from 15 is modified to advance the instants in each half cycle thereof when the supply is switched to the load.

When however, there is no load current, the supply 10 being switched off, there is no signal in the line 13 and the gate 14 is effective to modify the signal derived from 15 such that the instant during each half cycle of the supply when the supply is connected through to the load 12 is fully retarded so that the mean current during the first few half cycles after turning on the supply is held to a low safe value. When load current is established, the modification by 14 of the control signal is reduced so that the control signal can take over control of the mean load current.

Referring to the circuit as illustrated by FIG. 2, in the absence of a base signal the transistor VT passes only leakage current, irrespective of the value of the collector voltage, the collector voltage being provided by the control signal. The control signal from source 15 of FIGURE 1 is therefore not transmitted to the control circuit 11.

The design of the circuit is such that when the supply is switched on, a small load current flows. This produces a charge on the capacitor C2 via the transformer T and the rectifiers MR1, MR2. The capacitor C1 then charges at a rate determined by the time constant of capacitor C1 and resistor R4 (modified by a change in the charge of the capacitor C2 as the load current increases) which is chosen to produce the required delay in application of the control signal to the control circuit. A fraction of the voltage on capacitor C1 is applied to the base of the transistor VT, the polarity of this voltage being such as to cause the transistor VT to conduct an emitter-collector current in excess of the normal leakage current. The emitter voltage of the transistor VT thus follows the base voltage until the latter reaches almost the same potential as the control voltage at the collector voltage. The emitter voltage can then rise no further and remains at a value slightly below the collector voltage. If the base voltage continues to rise, the rising base current flowing through the emitter resistor R1 produces insignificant change in the emitter voltage.

If the load current is interrupted, the capacitor C2 discharges rapidly through the resistor R5 and the capacitor C1 discharges through the diode D and resistor R5, thus quickly resetting the circuit.

It will be appreciated, that whilst the gate circuit as described merely comprises a simple CR network, more complex systems may be used if necessary or desired whilst the choice of the type of transistor is arbitrary.

Moreover, in suitable circumstances a signal representing the load current may be impressed upon the gate circuit by means other than a transformer.

Having thus described our invention what we claim is:

1. In combination with a source and a load, a circuit arrangement for controlling the supply of electric current from said source to said load and for preventing surge current to said load comprising sensing means connected to said load for providing an output signal representative of the magnitude of current supplied to said load, control circuit means connected between said source and load for controlling the magnitude of said current, means connected to said control circuit for applying a control signal thereto, modifying means connected between said control signal applying means and said control circuit means for modifying said control signal, and time delay means connected to said sensing means and said modifying means and responsive to said output signal for causing said modifying means to modify said control signal.

2. The circuit arrangement of claim 1, wherein said time delay means causes said modifying means to gradually increase the control signal over a time period determined by said time delay means.

3. A circuit arrangement as claimed in claim 1, said modifying means comprising means for attenuating the control signal.

4. A circuit arrangement as claimed in claim 1, said sensing means comprising a transformer having a primary winding and a secondary winding, the primary winding being connected in series with the load and the output signal being generated in the secondary winding.

5. A circuit arrangement as claimed in claim 4, including a full wave rectifier via which said secondary winding is coupled to said modifying means.

6. A circuit arrangement as claimed in claim 5, said time delay means including a storage capacitor and a resistive and capacitive time constant circuit, said time constant circuit being connected to charge up from said full wave rectifier via said storage capacitor.

7. A circuit arrangement as claimed in claim 6, a separate discharge path being provided operative to discharge said time constant circuit when the current in the load is cut off.

8. A circuit arrangement as claimed in claim 6, said modifying means comprising a transistor having an emitter-collector path, the said control signal being applied to said control circuit via the emitter-collector path of said transistor, said transistor having a base by which control current is applied from and dependent upon the charge on said time constant circuit.

References Cited by the Examiner

UNITED STATES PATENTS

| | | | |
|---|---|---|---|
| 3,046,412 | 7/1962 | Seike | 307—88.5 |
| 3,074,008 | 1/1963 | McPhail et al. | 307—88.5 |

ARTHUR GAUSS, *Primary Examiner.*